Jan. 4, 1966 S. PROKUPEK ET AL 3,227,372
HEATING AND COOLING SYSTEM AND VALVE MEANS THEREFOR
Original Filed Sept. 11, 1961 2 Sheets-Sheet 1
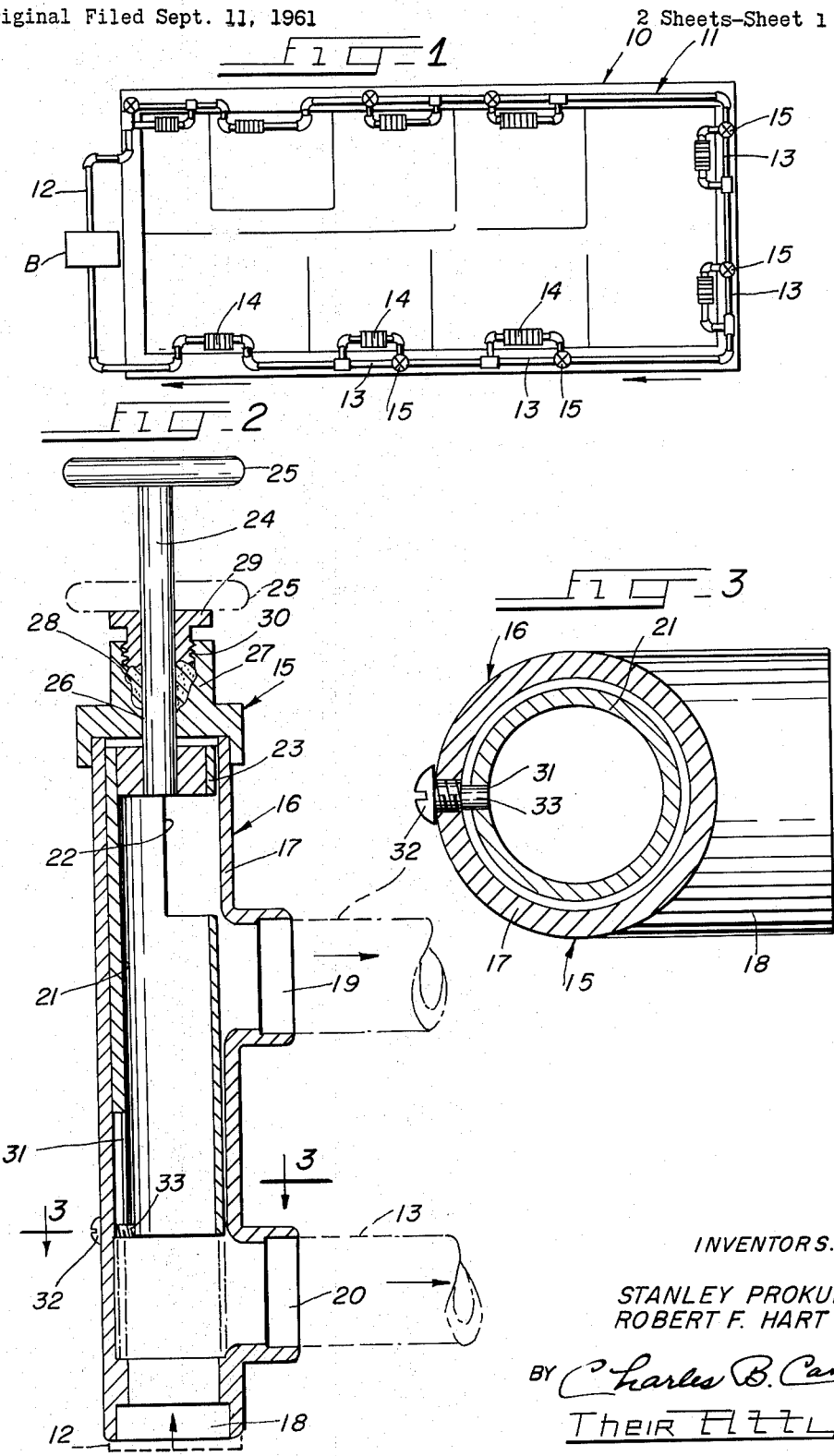
INVENTORS.
STANLEY PROKUPEK
ROBERT F. HART
BY Charles B. Cannon
Their Atty.

Jan. 4, 1966  S. PROKUPEK ET AL  3,227,372
HEATING AND COOLING SYSTEM AND VALVE MEANS THEREFOR
Original Filed Sept. 11, 1961  2 Sheets-Sheet 2
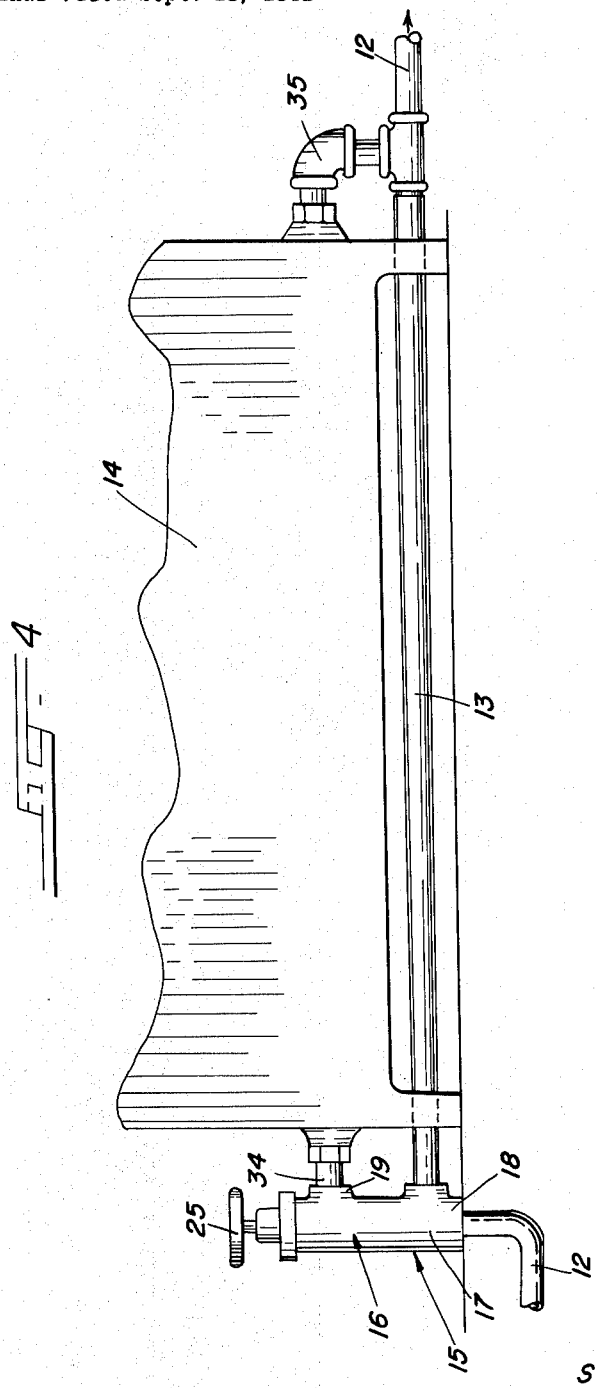
INVENTORS
STANLEY PROKUPEK
ROBERT F. HART
BY
Charles B. Cannon
Their Atty

United States Patent Office 3,227,372
Patented Jan. 4, 1966

3,227,372
HEATING AND COOLING SYSTEM AND VALVE
MEANS THEREFOR
Stanley Prokupek, 4319 Western Ave., Western Springs,
Ill., and Robert F. Hart, 4505 Highland Ave., Downers
Grove, Ill.
Original application Sept. 11, 1961, Ser. No. 137,221.
Divided and this application Aug. 17, 1965, Ser. No.
480,364
1 Claim. (Cl. 237—59)

This application is a division of our co-pending application, Serial No. 137,221, filed September 11, 1961 and entitled "Heating and Cooling System and Valve Means Therefor."

This invention relates to a single pipe heating and cooling system and valve means therefor.

An object of the invention is to provide a new and improved single pipe heating and cooling system and valve means therefor which may be used in connection with fluid heating systems, such as hot water heating systems, and cooling systems, for controlling the flow of heating or cooling fluid through the system and through radiators or like heat exchangers embodied therein, in such a manner that all of the heating or cooling fluid in the single pipe line may be directed through all of the radiators or like heat exchangers in the system or none or only a part of the heating or cooling fluid in the system may be passed through a selected radiator or radiators, or like heat exchangers, and the balance of the heating fluid bypassed around one or more radiators, or heat exchangers, as desired, without altering the operation or efficiency of the system, as such.

Another object of the invention is to provide a new and improved heating and cooling system which may be used in conjunction with different types of heating and cooling systems and with radiators or like heat-exchangers in a room to provide adequate temperature control in each radiator or like heat exchanger unit independently of the other radiators or heat exchanger units in the system.

Another object of the invention is to provide a new and improved valve unit for use in the new heating and cooling system and for carrying out the functions and purposes thereof.

A further object of the invention is to provide a new and improved heating and cooling system in which full temperature control is provided for each radiator or like heat exchanger in the system independently of all other radiators or heat exchangers in the system and without affecting or impeding the full and free flow of the heating or cooling fluid in the system.

Another object of the invention is to provide a new and improved hot water heating system in which a part or all of the hot water in the single pipe flow line may be by-passed around a selected radiator or radiators without interfering with or detracting from the heating efficiency of the system beyond such selected radiator or radiators.

Other and further objects of the present invention will be apparent from the following description and claims and are illustrated in the accompanying drawings, which by way of illustration show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention.

In the drawings:

FIG. 1 is a schematic plan view of a typical heating or cooling system embodying the present invention;

FIG. 2 is a central vertical sectional view showing a typical form of the new valve unit which may be employed in the practice of the present invention;

FIG. 3 is a horizontal sectional plan view on line 3—3 in FIG. 2; and

FIG. 4 is a fragmentary elevational view showing a typical form of a radiator or like heat exchanger unit embodied in the new heating and cooling system and having an embodiment of the new valve unit and bypass unit associated therewith.

A preferred embodiment of a heating or cooling system embodying the present invention is schematically illustrated in FIG. 1 of the drawings, where it is generally indicated at 10, and is shown as embodying a fluid circulatory system 11 such as a hot water heating system, or the like, which includes a source of hot water in the form of a hot water boiler B, and a single pipe flow line 12 associated therewith, and in which any desired number of heat exchanger or heat transfer units, such as radiators 14, of any suitable design and construction may be arranged at suitable intervals therein. In the practice of the present invention, the flow line pipe or tubing 12 may be of any suitable diameter such, for example, as ¾".

A flow control valve unit 15 may be associated with each of the radiators or like heat exchangers 14 for the purpose of controlling the flow of hot water or like heating or cooling fluid through the radiator 14 or bypassing all or a part of the flow around one or more radiators 14, as desired, through a bypass line 13 which is associated with each radiator 14. In the practice of the present invention the diameter of each of the bypass lines 13 is the same as that of the main single pipe flow line 12 and, in the example given above, is ¾", although the diameter of the flow line pipe 12 and bypass lines 13 may be varied to suit different heating and cooling systems as long as the diameter of the single pipe flow line 12 and bypass lines 13 is kept the same.

A typical embodiment of the new flow control valve unit is illustrated in FIGS. 2 and 3 of the drawings, wherein it is generally indicated at 15, and includes a valve body 16 comprising a generally cylindrical housing 17 having an inlet opening 18 at its lower end and which is adapted to be connected into the single pipe flow line 12 (FIGS. 1 and 4) at the inlet side from the boiler B and adjacent the inlet side of one of the radiators 14. As shown in FIG. 2, the valve housing 17 has an upper radiator outlet opening 19 and a lower bypass outlet opening 20 formed therein. The upper hot water outlet opening 19 is adapted to be connected by a suitable connection 34 to the radiator 14 (FIG. 4) and the lower bypass outlet opening 20 is connected directly into the bypass line 13; the outlet side of the radiator 14 being connected, as at 35, to the flow line 12 (FIG. 4).

A generally tubular or cylindrical valve member 21 is slidably mounted in the valve housing 17 and is provided with a single outlet port 22 which is adapted to be selectively disposed in or out of registry with the upper outlet opening 19.

The slidable valve member 21 has a piston member 23 secured thereto in the upper end portion thereof, and a valve stem rod 24 is attached to the piston member 23 and projects upwardly out of the valve housing 17. The valve stem rod 24 has a handle 25 attached to the upper portion thereof. The valve stem rod 24 projects through a central opening 26 in a closure cap 27, which is attached to the valve housing 17, and a suitable lubricating packing 28 is arranged in the valve cap 27 and is retained therein by closure plug 29 which is threaded into a central threaded opening 30 in the valve cap 27 (FIG. 2).

In the use of the invention as a hot water heating system 10, one of the new valve units 15 may be arranged in the inlet side of the single pipe flow line 12 in association with each of the radiators 14, as shown in FIGS. 1 and 4, and when it is desired to control the amount of the flow of water from the hot water boiler or source B to each radiator 14 this may be accomplished by manipulating the handle 25 on the valve stem rod 24 of one or more selected valve units 15.

In the form of the new valve unit shown in FIGS. 1 and 2 of the drawings, a slot 31 is provided in the body of the movable valve member 21 and a stop member, in the form of a screw member 32, is mounted in the wall of the valve housing 17 and has a portion 33 which extends into and works in the slot 31 (FIG. 2).

In the use of the new valve unit shown in FIGS. 1 and 2 of the drawings, the generally tubular or cylindrical movable valve member 21 may be manipulated, by the handle 25 and valve stem rod 24, and attached piston member 23, so as to position the movable valve member 21 in the position in which it is shown in FIG. 2 and in which position the lower end portion of the body of the movable member 21 is disposed above the bypass outlet 20 so that water entering the valve housing 17 from the flow line 12 will pass into the valve housing 17 by way of the inlet 18 and thence out of the bypass outlet 20 into the bypass line 13 and back to the flow line 12. However, in this position of the parts, as in FIG. 2, the movable valve member 21 closes the upper and radiator outlet 19 so that all of the water entering the valve housing 17 will flow from the inlet opening 18 through the valve housing 17 and out of the bypass outlet opening 20 and none of the water entering the valve housing 17 will flow out of the radiator outlet 19.

However, the slidable valve member 21 may be manipulated or depressed by the handle 25 and the valve stem rod 24 to position the port 22 partially or fully in registry with the radiator outlet 19 of the valve housing 17 so as to partially open the radiator outlet 19 and so as to partially close the bypass outlet 20, so that a part of the hot water entering the valve housing 17 by way of the inlet opening 18 may be directed out of the radiator outlet opening 19 to the radiator 14 and a part of the water in the flow line 12 may be directed through the bypass outlet 20 into the bypass line 13 and thence back into the flow line 12 without going through the radiator 14, or as desired, the movable valve member 21 may be positioned to entirely close the bypass outlet opening 20 and thus direct all of the hot water entering the valve housing 17 by way of the inlet 18 through the radiator outlet 19 to the radiator 14.

In the use of the valve unit shown in FIGS. 1 and 2 of the drawings, the portion 33 of the stop member 32, working in the slot 31, will guide the movable valve member 21 in the valve housing 17 and will limit the downward movement thereof when the wall which forms the upper end of the slot 31 engages the stop member 32–33.

It will be noted that in the practice of the present invention, full range temperature control is provided for each radiator or like heat exchanger in the system, independently of all other radiators or heat exchangers in the system, by reason of the fact that the diameter of the single pipe flow line 12 and of the bypass line 13 is the same and the new valve unit provides for a total free area of discharge from the radiator outlet opening 19 and from the bypass outlet opening 20 which is equal to the fluid input into the inlet opening 18 into the valve housing 17. This is for the reason that the total cross-sectional area of the outlet openings 19–20 is in all instances equal to the cross-sectional area of the inlet opening 18 and line 12 so that regardless of the position of the slidable valve member 21 the fluid flow through the single pipe line or system is not impeded by the use of any restricting or restrictive diameter bypass lines or valves, as in certain of the prior art heating and cooling systems. Moreover, regardless of the number of radiators 14 or like heat exchangers which are partially or fully bypassed the maximum fluid flow and heating or cooling efficiency of the new single pipe flow system beyond such selected radiator or radiators is preserved and is in no way impeded or lowered.

It will be noted that while the present invention has been illustrated in the drawings as applied to a hot water or like fluid heating system it is equally applicable to a fluid cooling or chilling system in which the boiler 12 would be replaced by a suitable cooling or refrigerating unit and the radiators 14 would be replaced by suitable heat-absorbing or like heat exchangers.

If desired, the valve 15 may be installed in the outlet side of the radiator, rather than at the inlet side as shown in the drawings.

It will thus be seen from the foregoing description, considered in conjunction with the accompanying drawings, that the present invention provides a new and improved single pipe heating and cooling system and a new and improved valve unit therefor, and that it has the desirable advantages and characteristics and accomplishes its intended objects including those hereinbefore pointed out and others which are inherent in the invention.

We claim:

In a space conditioning unit having a means for modifying the thermal condition of a circulating fluid and heat transfer means for conditioning the space surrounding the same through heat exchange employing said fluid and a single pipe fluid flow line connecting said means for modifying the thermal condition of said fluid and said heat transfer means, a valve means including a valve housing for operative connection with said two first mentioned means, said valve housing comprising an inlet opening therein for connection to one side of said single pipe fluid flow line, a bypass outlet opening in said valve housing for operative connection with the other side of said flow line, a second outlet opening in said valve housing in operative connection with said heat transfer means, the interior of said valve housing being cylindrical in cross section and having a valve element therein, said valve element being cylindrical in cross section and axially slidable within said housing and having an inlet port at one end and operating element at the other, a discharge port normal to the axis of the element for alignment or nonalignment with one of said housing outlet on axial shifting of said element, said other housing outlet being completely uncovered by said element on shifting thereof to one limit of its axial movement, said valve element movably mounted in said valve housing means for selectively controlling the flow of fluid from said valve housing through the bypass outlet opening and through said second outlet opening to selectively direct all of the fluid in the single pipe fluid flow line through the said heat transfer means when the valve member closes the said bypass opening and to direct all of the fluid through said bypass opening when said valve member closes said second outlet opening and to further direct a part of said fluid in the single pipe fluid flow line through the said heat transfer unit and the balance of said fluid through said bypass opening when said valve member partially closes the bypass opening and the second outlet opening, said valve member and valve housing being so constructed and arranged that the total area of the outlet openings in all positions of the valve member is equal to the area of the inlet opening.

References Cited by the Examiner

UNITED STATES PATENTS 1,106,981  10/1914  Speckman _____ 237—70 X

FOREIGN PATENTS 135,515  4/1952  Sweden.

WILLIAM F. O'DEA, *Primary Examiner.*